(No Model.)

W. POYNER.
COMBINED DINNER PAIL AND LUNCH BASKET.

No. 450,527. Patented Apr. 14, 1891.

Witnesses.
E. Byron Gilchrist

Inventor.
William Poyner

UNITED STATES PATENT OFFICE.

WILLIAM POYNER, OF CLEVELAND, OHIO.

COMBINED DINNER-PAIL AND LUNCH-BASKET.

SPECIFICATION forming part of Letters Patent No. 450,527, dated April 14, 1891.

Application filed January 23, 1891. Serial No. 378,811. (No model.)

*To all whom it may concern:*

Be it known that I, WILLIAM POYNER, of Cleveland, in the county of Cuyahoga and State of Ohio, have invented certain new and useful Improvements in a Combined Dinner-Pail and Inclosing Basket; and I do hereby declare the following to be a full, clear, and exact description of the invention, such as will enable others skilled in the art to which it pertains to make and use the same.

My invention relates to a combined dinner-pail and inclosing basket; and it consists in certain features of construction and in combination of parts hereinafter described, and pointed out in the claim.

Figure 2:
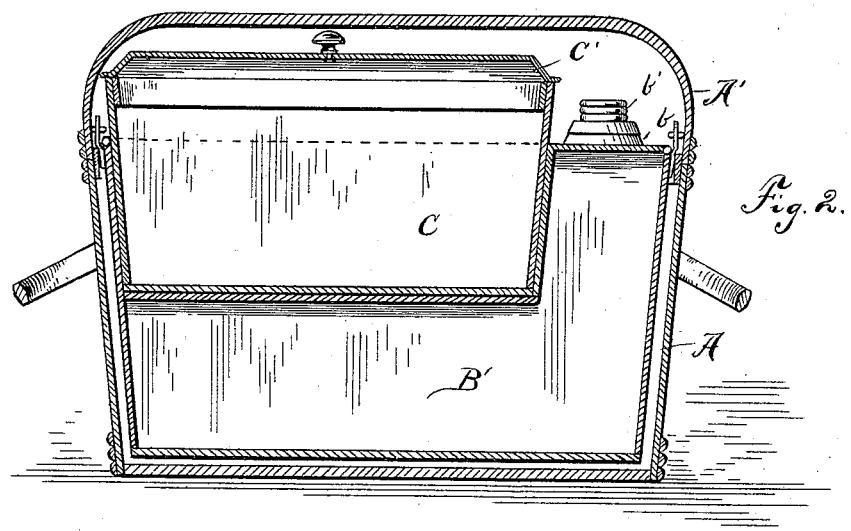
Figure 1:
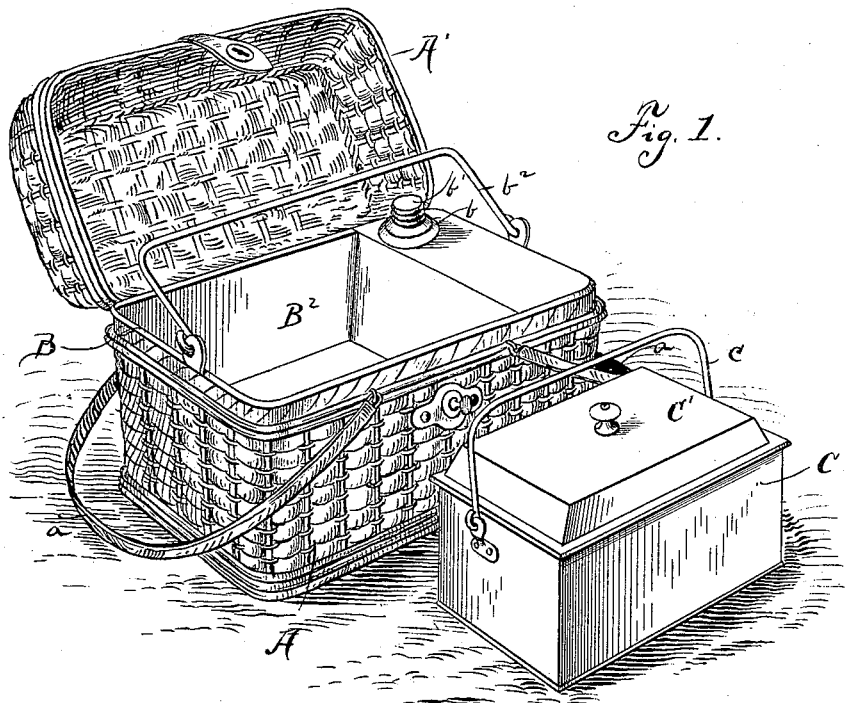

In the accompanying drawings, Figure 1 is a view in perspective showing the basket open and the tray of the dinner-pail removed. Fig. 2 is an elevation in longitudinal central section.

A represents the basket, and B the dinner-pail. The basket is preferably rectangular in plan and provided with a cover A' and means for locking the same and provided with long loops $a$, serving as handles, so that the device may be carried on the arm. The dinner-pail has a chamber B' extending internally along the length and breadth of the pail along the lower section thereof, and extending from thence upward at the one end of the pail and terminating above in a nozzle $b$, closed by a removable screw cap or plug $b'$, that is supposed to hermetically seal this chamber. This chamber is for carrying tea, coffee, or other liquid refreshment, and if the device were upset the liquid would not be spilled. The inner pail has a handle or bail $b^2$, by means of which it can be removed from the basket and afterward handled. After partitioning off the necessary space for chamber B' there will still remain a square or rectangular recess or pocket $B^2$, preferably tapering downward, and in this recess is nicely fitted the removable tray C, this tray having a cover C' and a handle $c$. This tray is to contain the more solid food, lobster or chicken salad, bread and butter, pork and beans, or what not, according to circumstances. The dinner-pail may be removed from the basket and set upon the stove to warm the coffee. Meantime the tray may be left in place or removed, according as it is desired to warm the food or otherwise. When the parts are assembled and the cover of the basket is closed and fastened, the tray and cover and the pail are held securely in place. The cover C' may be struck up, for instance, in the form shown, and, being removable, may serve as a drinking-cup, and the pail may be reversed to pour or drink out of the nozzle.

What I claim is—

A combined dinner-pail and basket, the pail being adapted to fit inside the basket, the pail being provided with a chamber for liquids and a nozzle and removable plug or cap for hermetically sealing the chamber, the pail having a tapering recess in which is fitted a tray, the latter having a cover and handle, substantially as and for the purpose set forth.

In testimony whereof I sign this specification, in the presence of two witnesses, this 27th day of December, 1890.

WILLIAM POYNER.

Witnesses:
C. H. DORER,
WARD HOOVER.